(12) United States Patent
Ouyahia et al.

(10) Patent No.: US 7,572,120 B2
(45) Date of Patent: Aug. 11, 2009

(54) TIRE MOLD

(75) Inventors: Yacine Ouyahia, Bereldange (LU); Christophe Jean Alexis Pierre, Aubange (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/257,438

(22) Filed: Oct. 24, 2008

(65) Prior Publication Data
US 2009/0162461 A1 Jun. 25, 2009

Related U.S. Application Data

(60) Provisional application No. 61/015,382, filed on Dec. 20, 2007.

(51) Int. Cl.
*B29C 35/02* (2006.01)
(52) U.S. Cl. .......................... 425/40; 425/46
(58) Field of Classification Search .................. 425/40, 425/46
See application file for complete search history.

(56) References Cited

U.S. PATENT DOCUMENTS

| | | | | |
|---|---|---|---|---|
| 2,046,372 A | * | 7/1936 | Engstrom | 425/40 |
| 2,185,542 A | * | 1/1940 | Daniel | 425/40 |
| 2,932,853 A | * | 4/1960 | Fike | 425/17 |
| 3,154,814 A | * | 11/1964 | Fike | 425/40 |
| 3,833,323 A | | 9/1974 | Pasch | 425/47 |
| 3,910,735 A | * | 10/1975 | Caretta | 425/46 |
| 3,999,907 A | * | 12/1976 | Pappas | 425/46 |
| 4,515,541 A | | 5/1985 | Salvadori | 425/47 |
| 4,553,930 A | * | 11/1985 | Cox et al. | 425/40 |
| 4,580,959 A | * | 4/1986 | Pizzorno et al. | 425/46 |
| 4,883,415 A | * | 11/1989 | Salvadori | 425/46 |
| 6,413,068 B1 | * | 7/2002 | Steidl et al. | 425/40 |

OTHER PUBLICATIONS

European Search Report, completed Mar. 3, 2009.
Patent Abstracts of Japan, Publication No. 07266340 dated Oct. 17, 1995.

* cited by examiner

*Primary Examiner*—James Mackey
(74) *Attorney, Agent, or Firm*—June E. Rickey

(57) ABSTRACT

The invention provides a segmented mold having a plurality of segments arranged to form an annular cavity to mold a tire. Each of the segments have an inner face for molding the tread, one or more channels, and one or more members received in each channel. The members are joined together to form a fluid manifold for circulating a fluid medium therein. Preferably, the channels are located on the outer radial surface of the segments.

1 Claim, 10 Drawing Sheets

TIRE MOLD

This application claims the benefit of, and incorporates by reference, U.S. Provisional Application No. 61/015,382 filed Dec. 20, 2007.

FIELD OF THE INVENTION

The present invention relates to a mold for a pneumatic radial tire, and more particularly, to a segmented tire mold.

BACKGROUND OF THE INVENTION

Tire molds for molding pneumatic tires are typically constructed of steel or aluminum, and heated by steam platens or by placing the molds in potheaters. Thermal conduction is usually relied upon to transfer the heat from the heat source to the tread and sidewall forming surfaces. It is desirable to maximize the heat conduction to the tread and sidewall forming surfaces. If the thermal conduction is less than optimum, it will require additional cure time and energy costs resulting in reduced production capacity for the mold and higher operating costs. Inefficient thermal conduction can also result in temperature non-uniformity in the mold. The time to cure a tire is limited by the point of least cure on the tire, which is typically located on the undertread or in the bead area. Thus if this area could be cured quicker, the entire time of the process may be reduced. Thus an improved mold is desired which can heat the tire more quickly, uniformly and efficiently.

SUMMARY OF THE INVENTION

The invention provides in a first aspect a segmented mold comprising a plurality of segments arranged to form an annular cavity to mold a tire, the segments further include an inner face for molding the tread, said segments having one or more channels, one or more members received in said one or more channels, said members being joined together to form a fluid manifold for circulating a fluid medium therein. Preferably, the channels are located on the outer radial surface of the segments.

The invention provides in a second aspect a segmented mold comprising at least a first and second segment arranged to form an annular cavity to mold a tire. The segments include an inner face for molding the tread, an outer surface, the outer surface having two or more channels, each channel having a tubular member received therein, wherein the first segment has a first and second tubular member, and the second segment has a first and second tubular member, wherein the first tubular member of the first segment is joined to the second tubular member of the second segment with a first crossmember, and the second tubular member of the first segment is joined to the first tubular member of the second segment with a second cross member, wherein all of said members being joined together to form a fluid manifold for circulating a fluid medium.

BRIEF DESCRIPTION OF THE DRAWINGS

The invention will be described by way of example and with reference to the accompanying drawings in which.

DEFINITIONS

"Axial" and "axially" means the lines or directions that are parallel to the axis of rotation of the tire or tire mold.

"Circumferential" means lines or directions extending along the perimeter of the surface of the annular tread mold perpendicular to the axial direction.

"Radial" and "radially" mean directions radially toward or away from the axis of rotation of the tire or tire mold.

"Sidewall" means a portion of a tire between the tread and the bead.

DETAILED DESCRIPTION OF THE INVENTION

Figure 1:
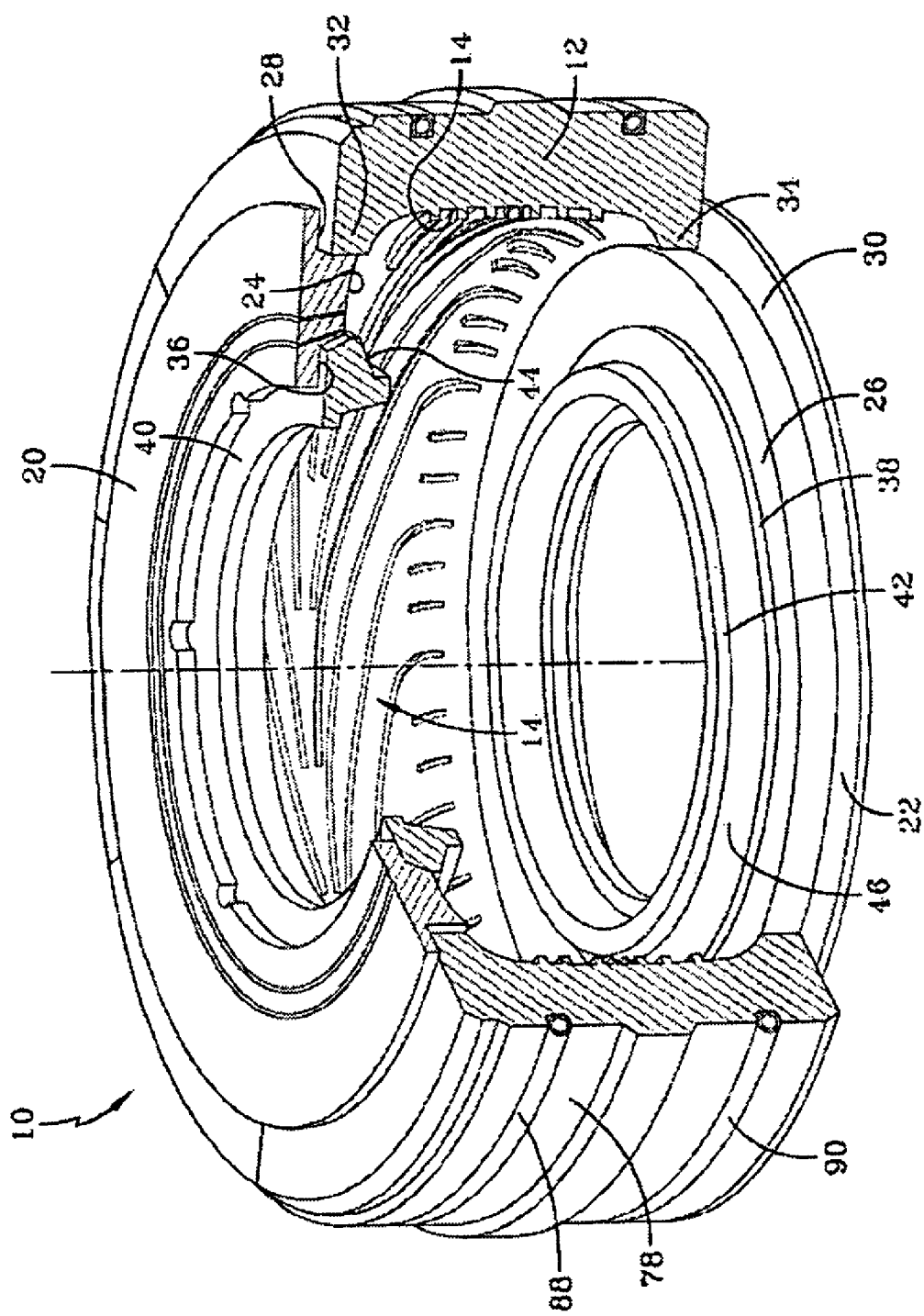
FIG. 1 is a partial cutaway view of an inner segmented mold assembly showing only the segments, sidewall plates and mold rings.

FIG. 1 illustrates a first embodiment of a mold assembly 10 of the present invention. The mold assembly 10 comprises a plurality of segments 12 which are arranged to form an annular ring when assembled together. The outer tread surface of a tire is formed by the inner molding surface 14 of the segments 12, which have a plurality of lands and grooves to mold the tread pattern in a green tire. The mold segments 12 may be radially movable to allow assembly and disassembly of the mold about a green tire.

The mold assembly 10 further comprises a first and second sidewall plate 20, 22 for molding the sidewalls of the tire (not shown). Each sidewall plate 20, 22 has an inner mold surface 24, 26 for molding the tire sidewall, and joins with the segments 12 to form a smooth continuous surface from the tire tread to the sidewall. Each sidewall plate 20, 22 may additionally comprise an optional radially outer lip 28, 30 forming an L shaped recess for receiving a first and second flanged end 32, 34 of the segment therein. Each sidewall plate 20, 22 further comprises a radially inner extension or lip forming a second L shaped recess 36, 38 for receiving a mold bead ring 40, 42 therein. Each bead ring 40, 42 has a radiused portion 44, 46 for receiving a bead area of a green tire thereon. The upper and lower sidewall plate 20, 22 together with the plurality of tread segments 12 and the top and bottom bead rings 40, 42 cooperate to define a mold cavity for molding a green tire.

Figure 3:
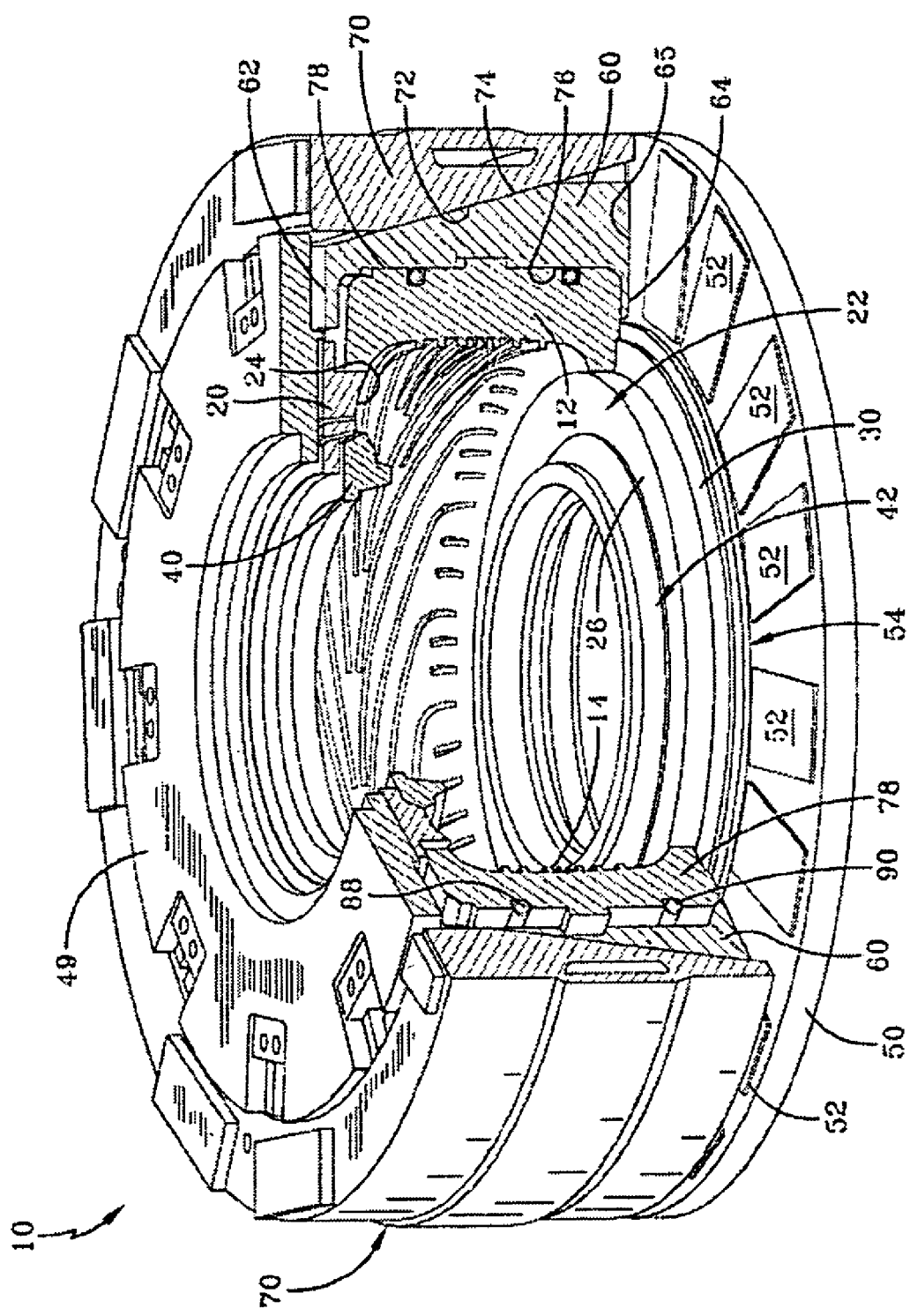
FIG. 3 is a partial cutaway view of a complete tire mold assembly showing the outer container parts.

The mold assembly 10 is typically housed in an optional container housing as shown in FIG. 3. The container typically includes a top and bottom container plate 49, 50 having a plurality of optional wear plates 52 thereon. The bottom container plate 50 has in inner annulus 54 for supporting the sidewall plate 22 and bead ring 42 thereon as shown in FIG. 3. The segments 12 are shown positioned about the sidewall plate 22. Surrounding the segments 12 are a plurality of slide blocks 60. The slide blocks 60 have flanged ends 62, 64 for receiving and supporting the segments 12 therein. The slide blocks 60 have a top and bottom surface 63, 65 for contacting the container plate 49, 50 and wear plates 52. The slide blocks 60 are slidable in a radial direction. The container housing further comprises an annular actuating ring 70. The inner radial surface 72 of the actuating ring 70 is angled for engagement with an outer angled surface 74 of slide blocks 60. As the actuating ring 70 is lowered, the inner radial surface 72 of the actuating ring 70 engages the outer surface 74 of slide blocks, causing the slide blocks to slide radially inward. The camming action of the actuator ring 70 moves the slide blocks 60 radially inward. As the slide blocks move radially inward, the radially inner surface 76 of the slide block engages the outer radial surface 78 of the adjacent segment, moving the segment radially inward as the actuating ring is lowered into position.

Figure 2:
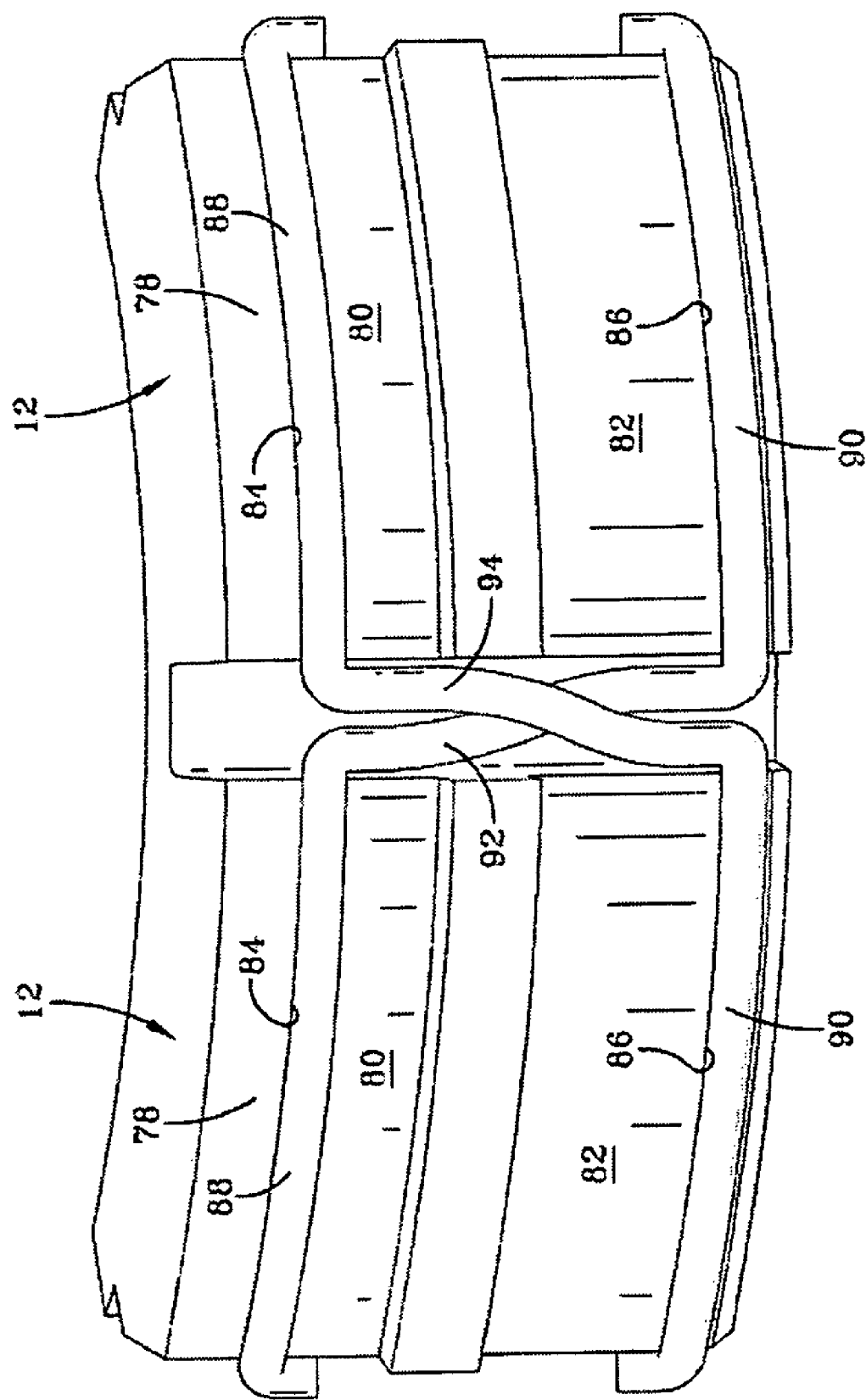
FIG. 2 is a rear view of two segments.

FIG. 2 illustrates a rear view of two of the tread mold segments of the present invention. The tread mold segments 12 have an outer radial surface 78 having a first or upper portion 80 and a second or lower portion 82. The first and second portions 80, 82 further comprise an open channel 84, 86 for receiving a tubular member 88, 90 respectively, therein. The tubular member 88, 90 may be flexible. As shown in FIG. 2, the tubular member is oriented for example, along the circumferential direction although other orientations may be utilized. It is preferred that the channel be deep enough so that the tubular member 88, 90 is flush or recessed when mounted in the channel. While not illustrated, the open channels 84 and 86 can optionally be located on the top and bottom surfaces of the tread segments depending on the thickness of the segments or other constraints.

Figure 7:
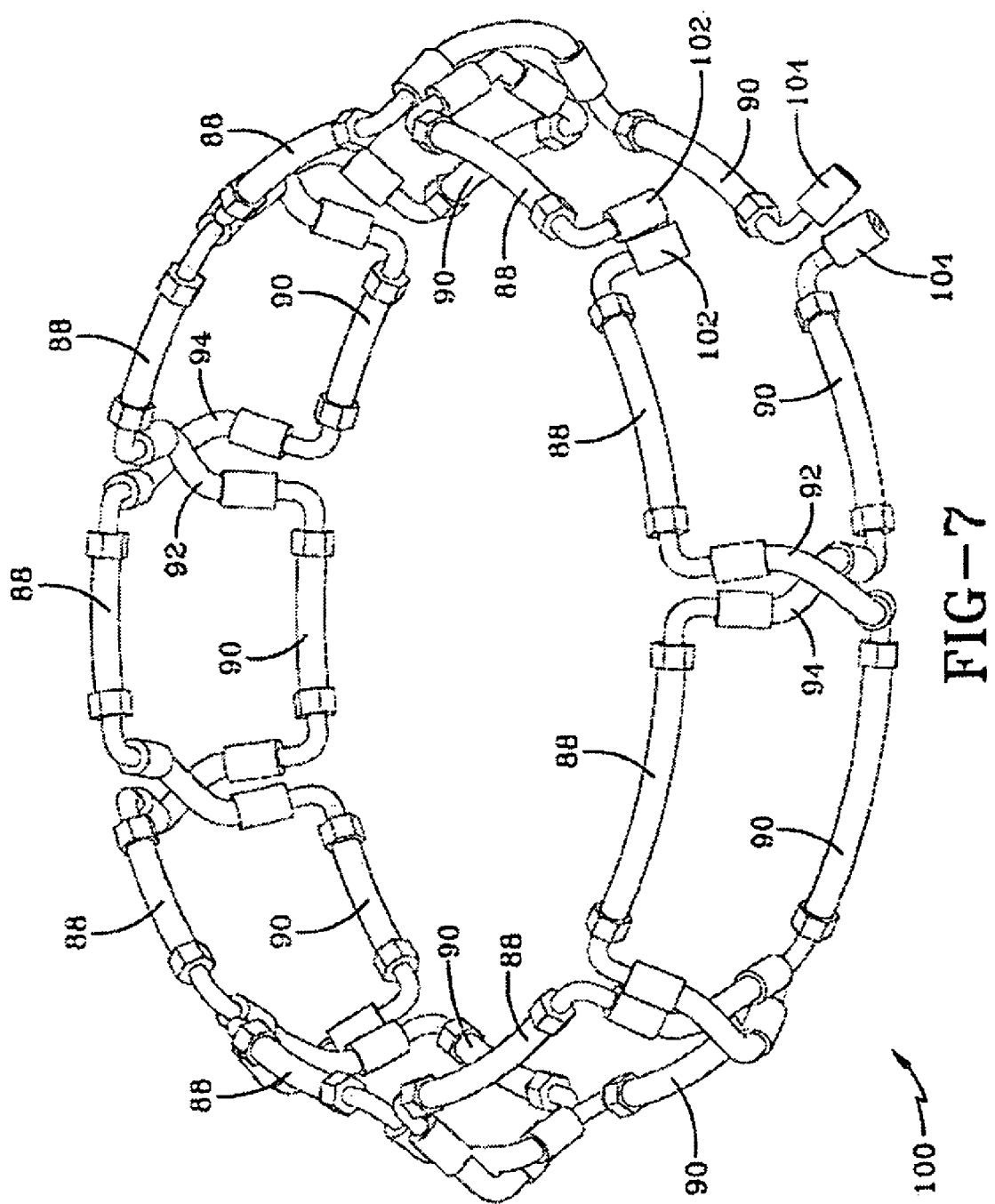
FIG. 7 is a perspective view of the flexible steam belt of the invention.

FIG. 7 illustrates the complete manifold assembly 100, wherein the mold has been removed for clarity. As shown in FIG. 7, the manifold assembly 100 comprises one or more inlet ports 102 and one or more outlet ports 104. Fluid such as steam enters the inlet port 102 and is routed through tubular members 88, 90. Tubular members 88, 90 are received in channels 84, 86 of a segment 12 and function to heat the segments by conduction of heat from the fluid flowing in the tubular segments 88, 90. A cross member 92 connects tubular member 88 on a first segment 12 to a lower tubular member 90 on an adjacent segment 12'. A second cross member 94 connects tubular member 88 to lower tubular member 90 on an adjacent segment. The cross members 92, 94 cross over each other where the segments are joined. Preferably the cross members 92, 94 are made of strong, flexible material such as polytetrafluorethylene (PTFE) reinforced stainless steel braid. This connection pattern is repeated for each segment. In the last segment, the upper and lower hose is joined together forming an outlet port. Because the segments move radially inward and outward, the hose segments must be flexible to accommodate the movement. As shown in FIG. 7, the upper tubular members 88 form a circle and are not directly joined to other upper tubular members 88. The lower tubular members 90 also form a circle although they are not directly or continuously connected together.

Figure 4:
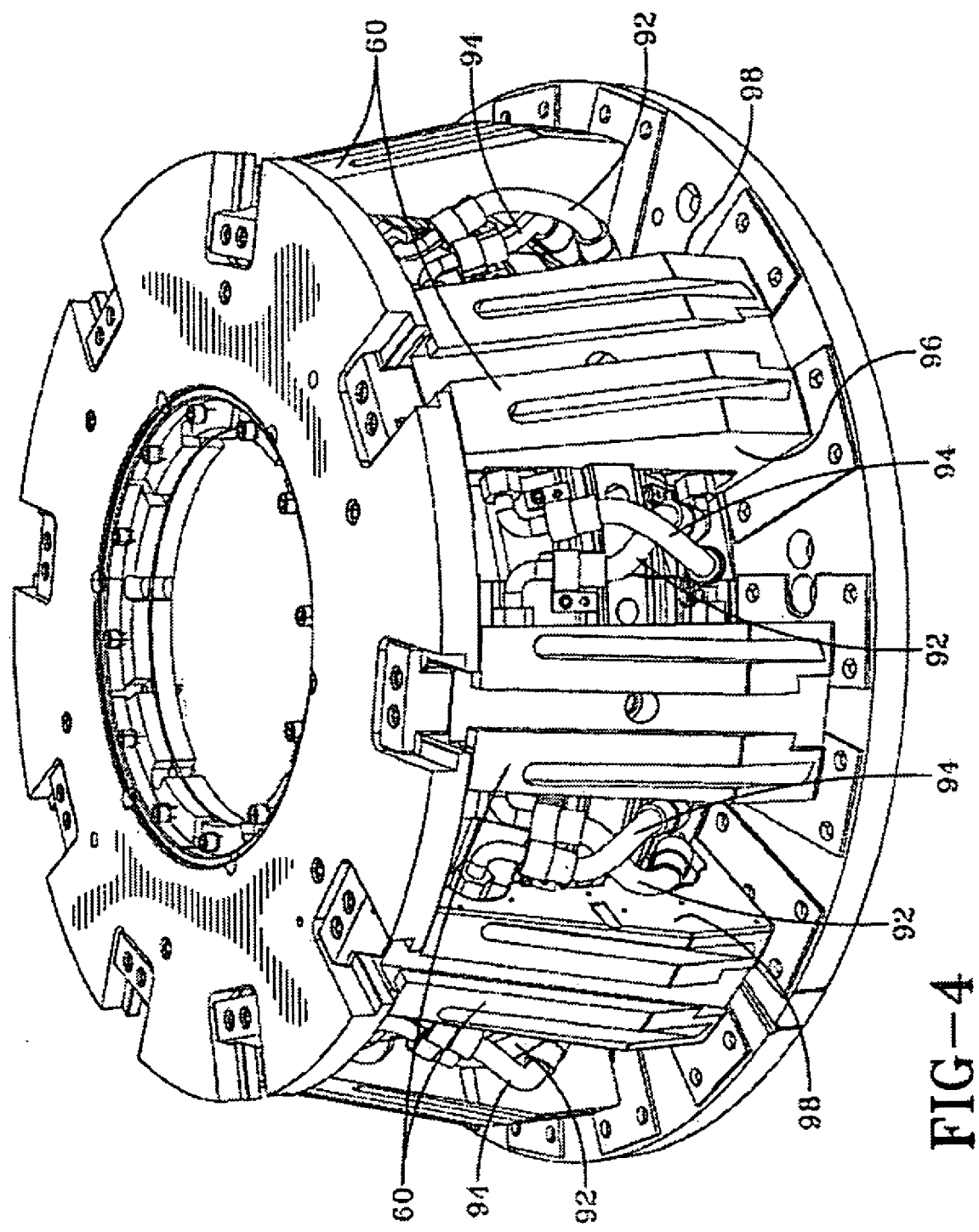
FIG. 4 is a partial cutaway view of the mold assembly of FIG. 1, with the actuator ring removed.
Figure 5:
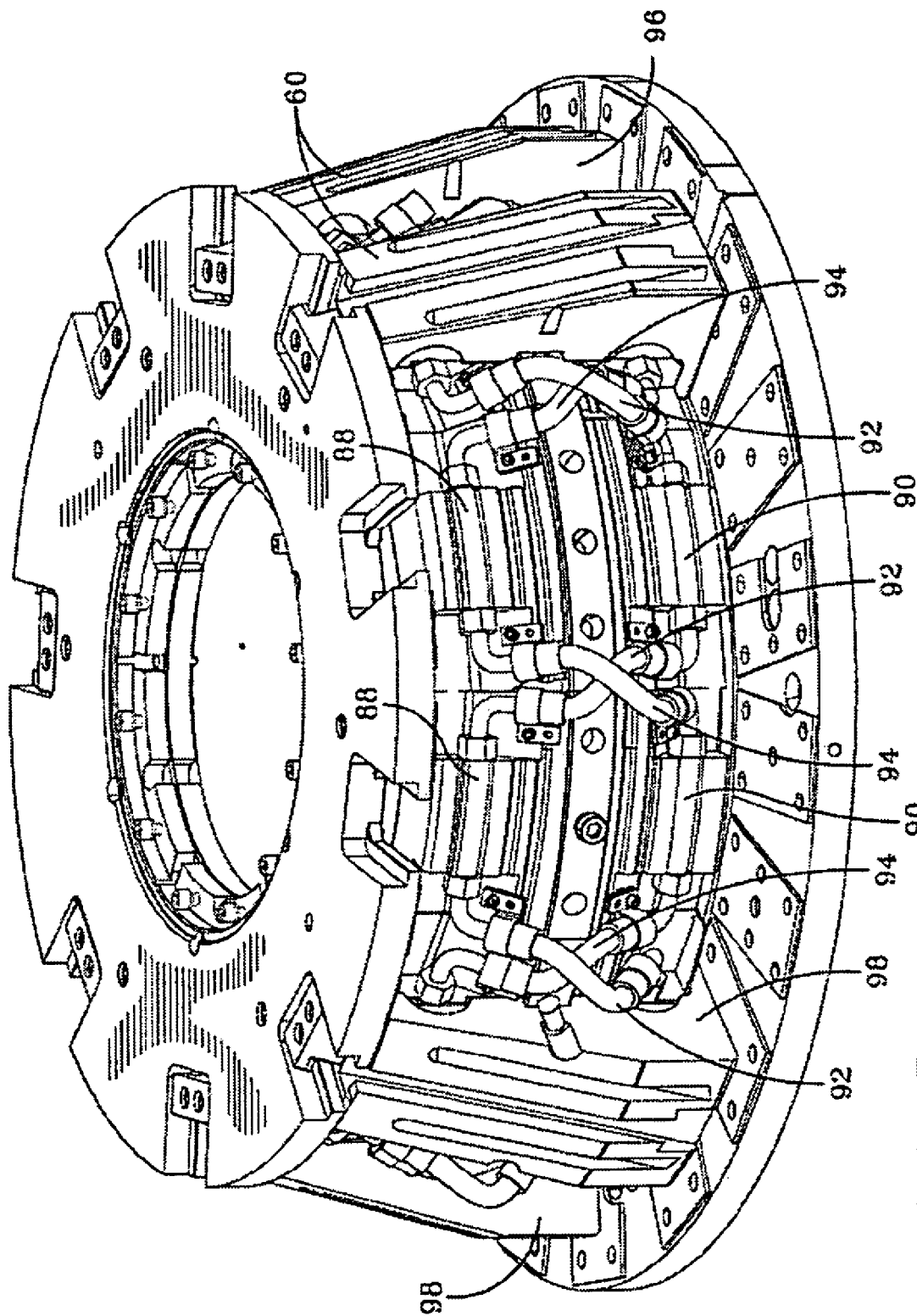
FIG. 5 is a perspective view of the mold shown in FIG. 4, with a portion of the slide blocks removed for clarity.
Figure 6:
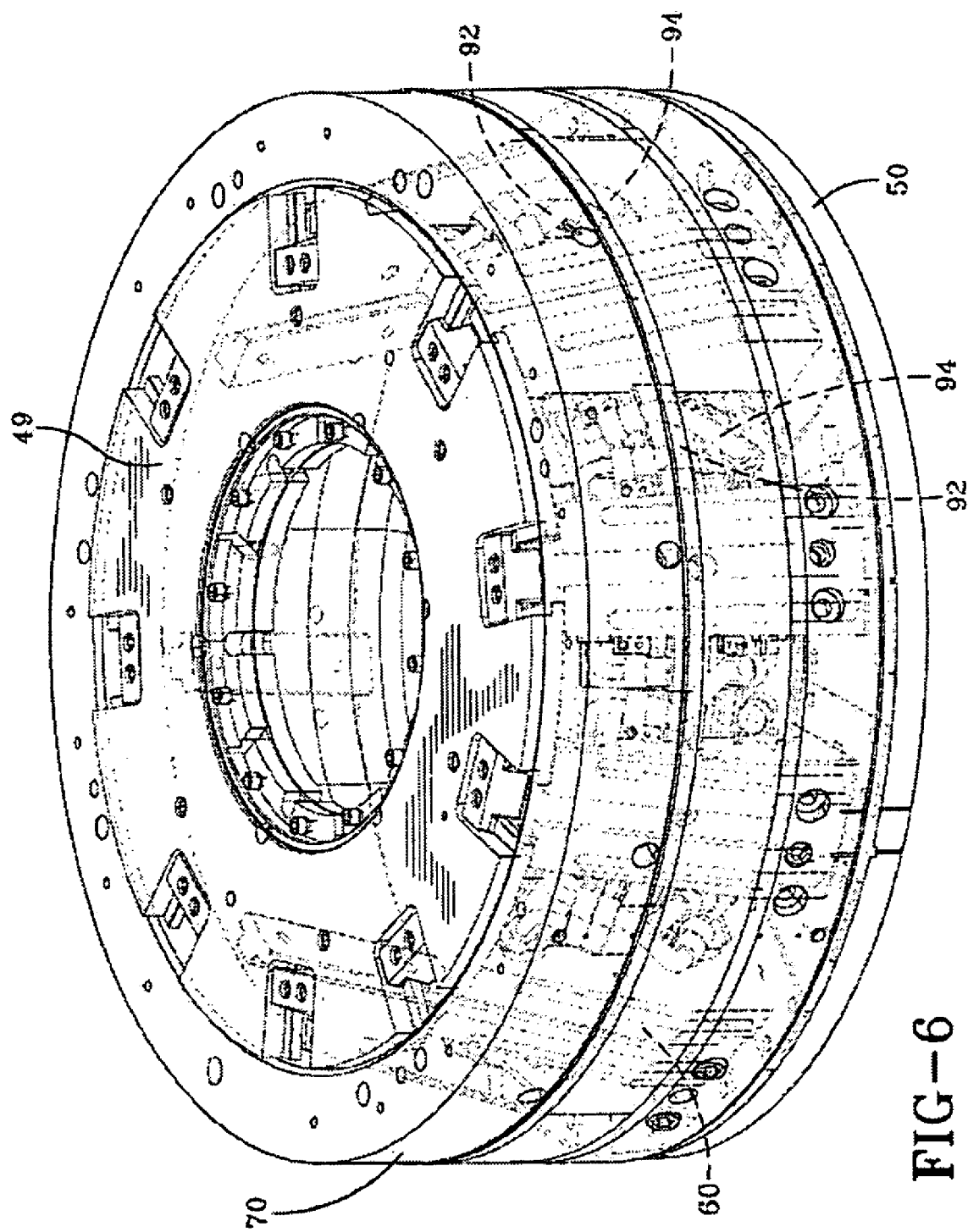
FIG. 6 is a perspective view of the entire assembly with the inner parts of the mold shown in phantom.

FIG. 4 illustrates the assembled mold with the actuating ring removed. The slide blocks 60 as shown have a reduced circumferential width so they appear staggered apart, and side faces 96, 98 are not in contact with either other when the mold is assembled.

Figure 8:
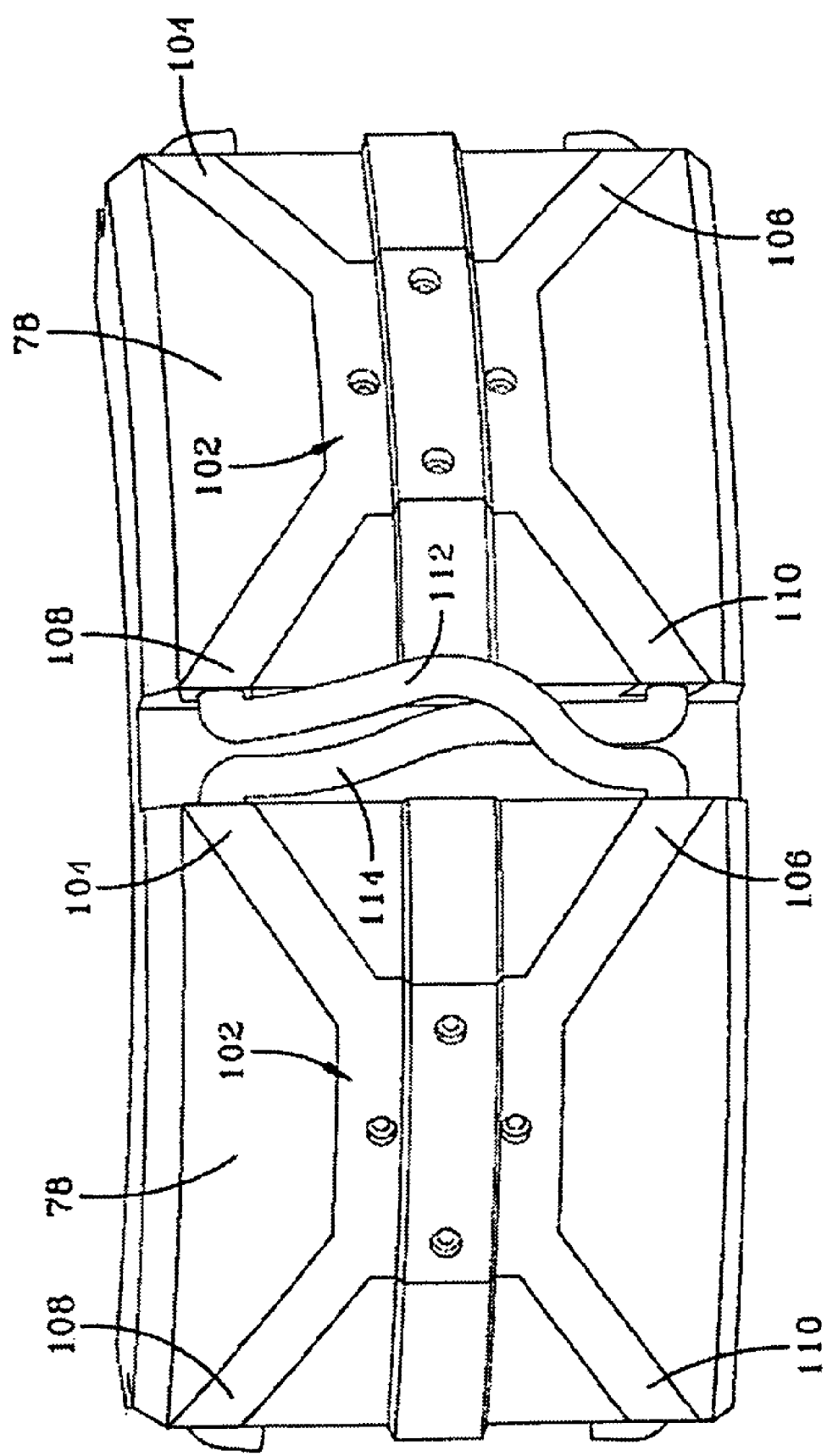
FIG. 8 is a rear view of a second embodiment of two segments.
Figure 9:
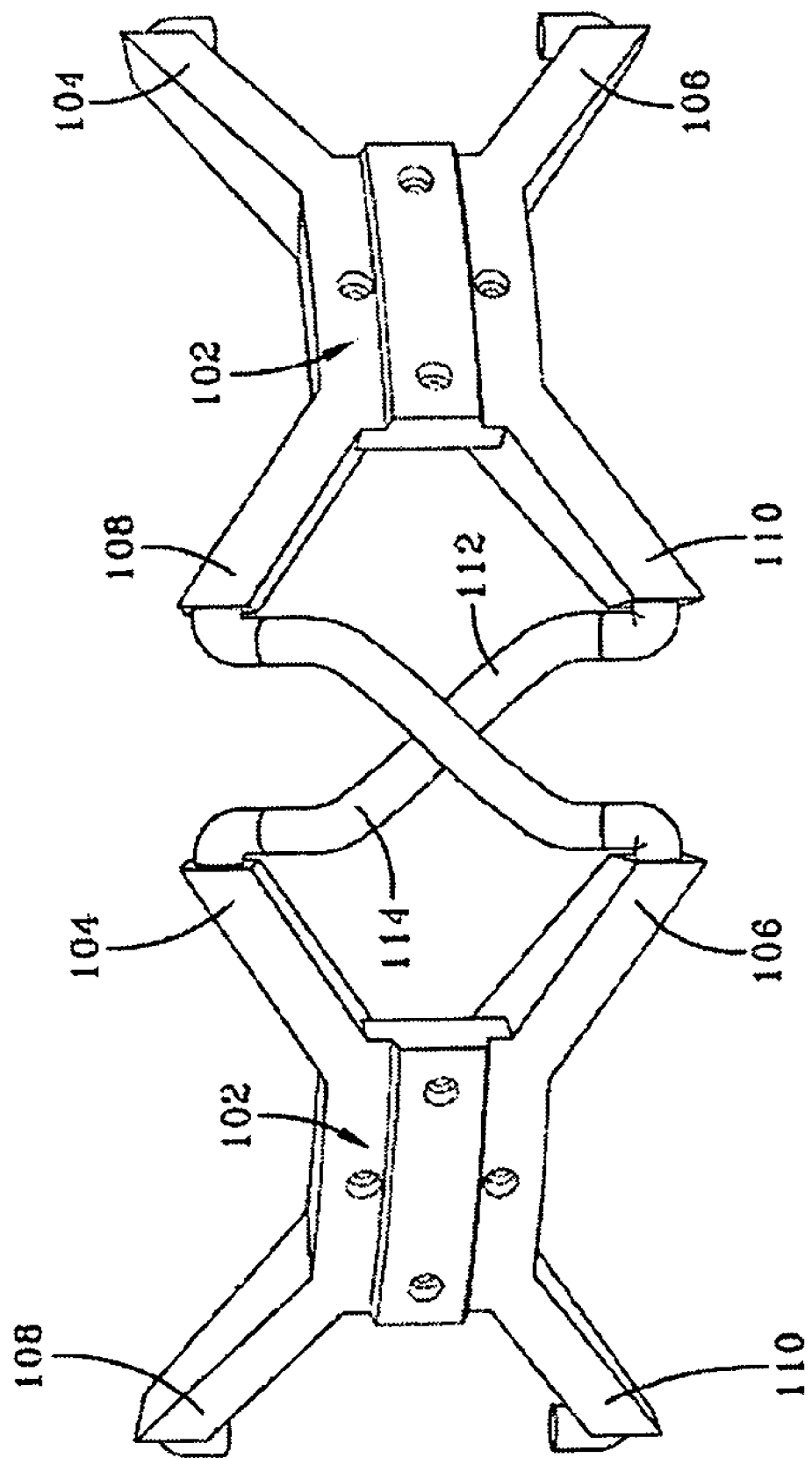
FIG. 9 is a front view of a coupling assembly and two cross members interconnecting the couplings.
Figure 10:
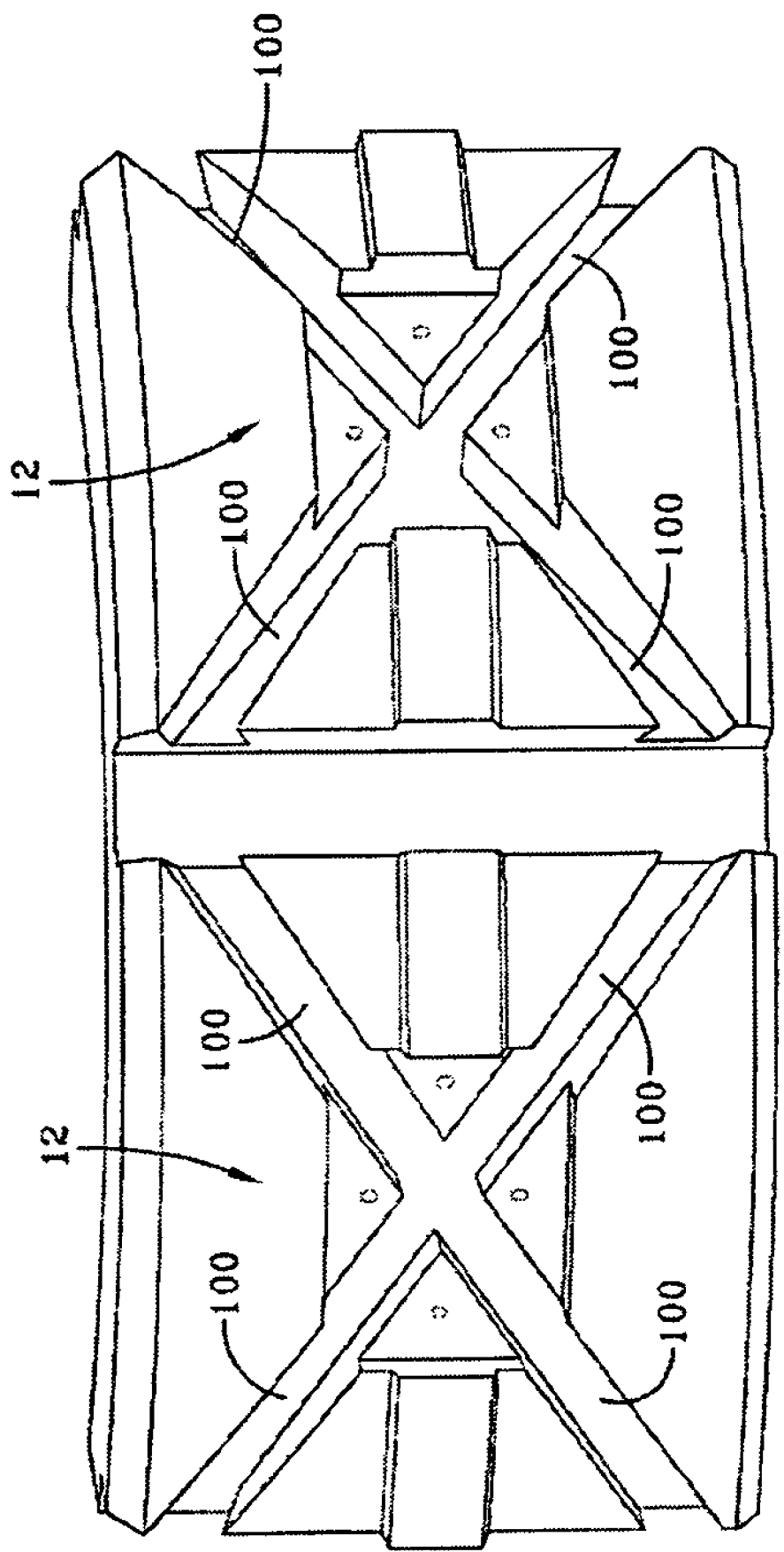
FIG. 10 is a rear view of two segments showing the channels for insertion of the coupling assembly.

FIGS. 8-10 illustrate a second embodiment of the invention. FIG. 8 illustrates the outer radial surface 78 of the segments 12. As shown in FIG. 10, the outer radial surface of the segments 12 have an X shaped channel 100. Received in the X shaped channel is an X shaped coupling 102. The X shaped coupling has two ports 104, 106 on one side, and two ports 108, 110 on the other side. An X shaped coupling is received in the channel of each segment. The couplings are connected together by cross members 112, 114. Cross member 112 joins upper coupling port 108 to lower coupling port 106 located on an adjacent coupling. Cross member 114 joins upper coupling port 104 to lower coupling port 110 of an adjacent coupling. The X shaped couplings on each segment are thus connected together with the cross members forming a manifold to conduct a fluid medium therein. The fluid medium may be steam or other fluid as desired. The invention is not limited to the X shaped couplings, as other shapes would work for the invention.

While a certain representative embodiment and details have been shown for the purpose of illustrating the invention, it will be apparent to those skilled in the art that various changes and modifications may be made therein without departing from the spirit or scope of the invention.

What is claimed is:

1. A segmented mold comprising at least a first and second segment arranged to form an annular cavity to mold a tire, the segments comprising an inner face for molding the tread, an outer circumferential surface, the outer circumferential surface having two or more channels, each channel having a tubular member received therein, wherein the first segment has a first and second tubular member, and the second segment has a first and second tubular member, wherein the first tubular member of the first segment is joined to the second tubular member of the second segment with a first crossmember, and the second tubular member of the first segment is joined to the first tubular member of the second segment with a second cross member, wherein all of said members being joined together to form a fluid manifold for circulating a fluid medium.

* * * * *